United States Patent [19]

Machell et al.

[11] Patent Number: 4,904,755

[45] Date of Patent: Feb. 27, 1990

[54] LOW BIREFRINGENT POLYESTERS IN OPTICAL DEVICES

[75] Inventors: Julie S. Machell, Webster; Paul D. Yacobucci, Rochester, both of N.Y.

[73] Assignee: Eastman Kodak Company, Rochester, N.Y.

[21] Appl. No.: 299,208

[22] Filed: Jan. 23, 1989

[51] Int. Cl.$^4$ .................. C08G 63/02; C08G 63/38
[52] U.S. Cl. ........................... 528/193; 528/190; 528/205
[58] Field of Search ................. 528/190, 193, 205

[56] References Cited

U.S. PATENT DOCUMENTS 4,247,681 1/1981 Mark et al. .
4,373,065 2/1983 Prest, Jr. .
4,387,209 6/1983 Rieder et al. .

Primary Examiner—Harold D. Anderson
Assistant Examiner—T. Mosley
Attorney, Agent, or Firm—J. Jeffrey Hawley

[57] ABSTRACT

There are disclosed low birefringent polyesters that are useful in optical devices. The polyesters include units having opposite optical anisotropies. By varying the ratio of the units in the copolymer, the birefringence of an article made from the copolymer can be controlled as desired. The polyester is a substantially optically anisotropic polyester having diol repeating units derived from 9,9-bis(4-hydroxyphenyl)fluorene and at least about 40% by weight of the diacid repeating units derived from aliphatic or cycloaliphatic dicarboxylic acids, the remainder of the diacid repeating units being derived from aromatic dicarboxylic acids.

5 Claims, No Drawings

LOW BIREFRINGENT POLYESTERS IN OPTICAL DEVICES

FIELD OF THE INVENTION

The present invention is directed to the use of low birefringent polymers in optical devices.

DESCRIPTION RELATIVE TO THE PRIOR ART

Polymeric materials are being used in many important optoelectronic devices such as wave guides, optical fibers, optical storage elements and similar devices. The ability to control the optical properties of the materials in these devices is important.

One of the important properties is the birefringence. Birefringence ($|BR|$) is defined as the difference in refractive index between two orthogonal planes of polarization as it expresses the level of optical anisotropy of the material. In many optical devices where light must pass through various materials of the device, it is important that the materials be optically isotropic, in other words, display low birefringence.

An optical storage element is a typical device where polymeric materials might be useful. The polymeric material might be used as the substrate for the optical element or it might be used as the cover sheet or protective layer to protect the recorded layer. In many cases therefore, it is necessary to focus the recording or read out lasers through the polymer material. If the material has high birefringence, the laser often can not be focused precisely.

One solution to this problem is to use polymer blends. In U.S. Pat. No. 4,373,065, for example, it is disclosed to use a blend of two polymers having opposite anisotropies. When such a blend is processed, the resulting polymeric material is optically isotropic. However, controlling the blend and finding a blend where the polymers are completely miscible are difficult problems.

As is noted in the '065 patent cited above, very few materials that have been proposed for optical devices are optically isotropic. Other materials which might be optically isotropic do not have sufficient dimensional stability to be practical. This is because the glass transition temperature of many materials is low enough that the material tends to flow under normal conditions. Further, high glass transition temperature is important where it is desired to further process the layer for example, where it is desired to sputter additional materials on the surface of the layer.

Thus, for example, poly(methyl methacrylate) has been proposed as the substrate for optical elements but this polymer, when processed to form the substrate has a glass transition temperature of only 100° C. and is therefore not desirable. Other materials such as polyethylene and other common polymers have been proposed but they display birefringence when formed into articles or thin layers.

One polymer proposed for use in optical devices has a suitable glass transition temperature but its birefringence is too high (polycarbonate, Tg 145° C., $|BR|$ 0.0065).

It should be mentioned that it is well known that it is desirable to attain optical anisotropy in the melt state for many polymers, particularly polyesters that are used to make fibers. This property of the melt is very often lost in the final article. Residual stresses in the polymer structure as the article is formed usually result in birefringence. Thus, polymers which have melt anisotropy will not necessarily be useful when formed into optical devices.

Thus, the problem has been that it is very difficult to find classes of polymers that are useful in optical devices such that the polymers have low birefringence while at the same time, high enough glass transition temperature to provide dimensional stability. It is to the solution of this problem that the present invention is directed.

SUMMARY OF THE INVENTION

In accordance with the invention there is provided an improved optical device wherein light passes through a polymeric material. The improvement is that the polymeric material is a substantially optically anisotropic polyester having diol repeating units derived from 9,9-bis(4-hydroxyphenyl)fluorene and at least about 40% by weight of the diacid repeating units derived from aliphatic or cycloaliphatic dicarboxylic acids, the remainder of the diacid repeating units being derived from aromatic dicarboxylic acids.

DETAILED DESCRIPTION OF THE INVENTION

The optical devices of the present invention are of the type wherein light must pass through a polymeric material. Thus, the devices are varied. The polymeric material may be the support or the protective layer of an optical recording element; it may be a lens for a camera or the protective layer therefore; it may be the transparent layer that is used in a waveguide or an integrated optical device; it may be the self supporting film for an optical filter; to mention but a few possibilities. The presently described polymers can be used in any application where it is desired to have low birefringence.

The polymers that are used according to the invention are known in the art. In U.S. Pat. No. 4,387,209, the polymers that are useful herein are described as useful materials for use as electrical insulation. There is no mention that these polymers have low birefringence and would therefore be useful in the optical devices described above. Another patent which describes similar polyesters is U.S. Pat. No. 4,247,681. This patent discloses a process for producing similar polyesters having low flammability. Again, no mention is made of the low birefringence of these polymers nor the possibility that they could be used to advantage in optical devices.

In view of these references, it is clear that the polymers used in the invention can be easily prepared by those skilled in the art.

The polyesters that are useful in the invention can be represented by the structural formula:

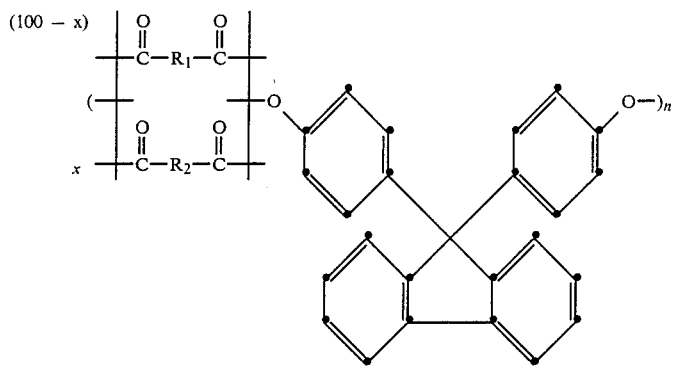

wherein $R_1$ is derived from aromatic dicarboxylic acids and $R_2$ is derived from a aliphatic or cycloaliphatic acid; and x is at least 40 and is preferably between about 80 and 100 by weight.

Not all of the polymers within this formula will have the desired combination of Tg and low birefringence. The exact value for x will depend on the particular selection of $R_1$ and $R_2$. However, once $R_1$ and $R_2$ are selected, x can be determined by preparing a series of polymers and plotting Tg and BR vs x.

As will be appreciated from the definition of $R_1$ and $R_2$ above, the nature of these groups is not critical. $R_1$ is derived from aliphatic or cycloaliphatic dicarboxylic acids such as, for example, aliphatic acids having from 2 to 10 carbon atoms in the aliphatic chain, preferably from 3 to 8 carbon atoms. Useful acids include glutaric, adipic, pimelic, suberic, azelaic and sebasic acid. Useful cycloaliphatic dicarboxylic acids include 1,4 cyclohexane dicarboxylic acid.

Similarly, the aromatic dicarboxylic acid is not critical. Useful acids include phthalic acid, terephthalic acid, isophthalic acid, phenylindan dicarboxylic acid, naphthalene dicarboxylic acid, phthalimide dicarboxylic acid and tetrahydro naphthalene dicarboxylic acid. Terephthalic acid and isophthalic acid are preferred.

In the formula above, n in an integer sufficiently high so that the polymer that results is film forming. Preferably, n is sufficient so that the molecular weight is above about 20,000.

The polymers that are useful in the present invention preferably have a glass transition temperature above about 125° C. and still more preferably above 150° C. Thus, the polymers have excellent dimensional stability. At the same time, the polymers have very low birefringence. By low birefringence, we mean that the absolute value of the birefringence, i.e. $|BR|$, is less than 0.0025 as measured by the method described in Example 1. In particularly preferred embodiments, $|BR|$ is less than 0.0010.

In the examples below, the glass transition temperature is reported. The glass transition temperature was determined using a DuPont differential scanning calorimeter (DSC). Ten grams of sample was placed in an aluminum DSC pan and placed in the DSC cell. The cell was purged with dry nitrogen at a flow rate of 30 cc/minute. The cell was then heated from 0° C. to 300° C. at a heating rate of 10° C. per minute. The sample was then quenched to 0° C. and reheated as before. The glass transition temperature was determined from the second heating.

The optical devices of the invention are made by conventional methods. For example, where the polymer is used as the material for the support of an optical recording element, it can be injection molded or melt cast. Where layers of the polymer are used, for example in optical wave guides or protective coatings, the layers can be solvent cast and then dried.

In the examples below, the polymers are identified by Roman numerals followed by a number in parenthesis. The Roman numerals represent variations in $R_1$ and $R_2$ as follows:

TABLE I

|   | $R_1$ | $R_2$ |
|---|---|---|
| I. | ⬡ | $-(CH_2)_7-$ |
| II. | ⬡ | ⬡S |
| III. | ⬡⬡ | $-(CH_2)_7-$ |
| IV. | ⬡⬡ | ⬡S |
| V. | — | $-(CH_2)_8-$ |

The number in the parenthesis in the examples below is the value for x in the formula above.

The following examples are presented for a further understanding of the invention.

EXAMPLE 1:

An optical device was prepared by coating polymers on a support. Polymer I(100), I(80), I(75), I(60), I(50) and I(40) were dissolved in 10–15% (wt:vol) solutions of dichloromethane and blade coated on a glass support. The solvent was evaporated by drying the coating at room temperature overnight and then for 3 days in a vacuum oven at 70° C. The coatings (films) were then removed from the glass support and were 20–50 μm in thickness. The birefringence was measured using a procedure developed by Spence (J. Phys. Chem., 43, 865 (1939) and Stein (J. Polym. Sci., 24, 383, (1957). The technique involves the measurement of birefringence in oblique incidence using a Soleil-Babinet compensator and a rotating sample stage. The copolymers based on structure I(X) produce a low-birefringent material ($|BR| <0.0010$) for compositions of X between 78 and 97 as determined from extrapolated plots of the data.

EXAMPLE 2:

Optical devices comprising polymers II(100), II(80), II(60) and II(40) were prepared in a manner similar to Example 1. The copolymers based on structure II(X) produce a low-birefringent material ($|BR| <0.0010$) for compositions of X between 80 and 90 as determined from extrapolated plots of the data.

EXAMPLE 3:

Optical devices comprising polymers III(100), III(40) and III(0) were prepared in a manner similar to Example 1. The copolymers based on structure III(X) produce a low-birefringent material ($|BR| <0.0010$) for compositions of X between 75 and 96% as determined from extrapolated plots of the data.

EXAMPLE 4:

Optical devices comprising polymers IV(100), IV(50) and IV(0) were prepared in a manner similar to Example 1. The copolymers based on structure IV(X) produce a low-birefringent material ($|BR| <0.0010$) for compositions of X between 62 and 80 as determined from extrapolated plots of the data.

EXAMPLE 5:

Optical devices comprising polymer V (100) were prepared in a manner similar to Example 1. The copolymer has a Tg of 146° C. and a $|BR|$ of 0.0007.

Table II shows some of the characterizing data for the polymers used in Examples 1–5.

TABLE II

| | Molecular Weights and Glass Transition Temperatures | | | |
|---|---|---|---|---|
| Polymer | Mn | Mw | Tg (°C.) | $|BR|$ |
| I(100) | 11,400 | 30,000 | 129 | 0.0010 |
| I(80) | 20,300 | 55,500 | 162 | 0.0006 |
| I(75) | 13,800 | 32,600 | 172 | 0.0008 |
| I(60) | 12,800 | 32,300 | 181 | 0.0014 |
| I(50) | 14,600 | 33,000 | 193 | 0.0018 |
| I(40) | 15,400 | 32,300 | 220 | 0.0024 |
| II(100) | 21,500 | 41,300 | 200 | 0.0016 |
| II(80) | 24,400 | 46,800 | ND | 0.0007 |
| II(60) | 25,000 | 46,700 | ND | 0.0022 |
| II(40) | 24,000 | 45,900 | ND | 0.0047 |
| III(100) | 11,400 | 30,000 | 129 | 0.0010 |
| III(40) | 13,500 | 30,100 | 209 | 0.0023 |
| III(0) | 11,700 | 28,600 | 279 | 0.0039 |
| IV(100) | 21,500 | 41,300 | 200 | 0.0016 |
| IV(50) | — | — | ND | 0.0011 |
| IV(0) | 11,700 | 28,600 | 279 | 0.0039 |
| V(100) | 15,300 | 36,700 | 146 | 0.0007 |

Mn = Number Average Molecular Weight (Polystyrene Equivalents)
Mw = Weight Average Molecular Weight (Polystyrene Equivalents)
ND = Not Determined Several other bisphenols were screened but were not studied extensively because they failed to have a glass transition temperature (Tg) within the desired 125° to 200° C. temperature range of interest. The polymers were dissolved in 10%–15% (wt:vol) solutions of dichloromethane, coated on glass substrates with a coating blade and dried overnight at ambient conditions. The films were than dried on the glass substrates in a vacuum oven for 3 days at 70° C. or 25° C. below the Tg, whichever was lower. The results of these five additional bisphenols are discussed in the following examples and their structures are shown in Table III below.

These are all comparative examples. None of these examples include a diol derived from 9,9-bis-(4-hydroxyphenyl)-fluorene.

EXAMPLE 6:

This is a comparative example.

Copolymers based on structure VI(X) (of Table III below) could produce samples with a birefringence less than 0.001 with the copolymer composition, X, greater than 80 but the Tg of the copolymer would be less than 80° C. and therefore not acceptable. The birefringence values of all structure VI(X) copolymers are greater than zero, none of them would be negative.

EXAMPLE 7:

This is a comparative example.

Only one copolymer of structure VII(X) was made, X=40%, the birefringence was 0.01 and the Tg was 191° C. Thus, if X was increased in order to lower the birefringence, the Tg would then be too low.

EXAMPLE 8:

This is a comparative example.

Copolymers based on structure VIII(X) approach a birefringence of 0.001 as X increases above 90%, but the Tg would be less than 100° C. The birefringence values of all VIII(X) structures would be greater than zero, none of them would be negative.

EXAMPLE 9:

This is a comparative example.

Copolymers based on structure IX(X) were made over the entire composition range and the birefringence was greater than 0.006 for all compositions.

EXAMPLE 10:

This is a comparative example.

Copolymers based on structure X(X) were made up to X=40% with a Tg of 161° C. and a birefringence of 0.0035. Thus, if copolymers with higher compositions of X were made to lower the birefringence the Tg would be less than 100° C.

EXAMPLE 11:

This is a comparative example.

Copolymers based on structure XI(X) were made up to X=40% with a Tg of 205° C. and a birefringence of 0.006. THus, if copolymers with higher compositions of X were made to lower the birefringence the Tg would be less than 125° C.

The copolymer structures examined in Examples 7, 10 and 11 did not cover the entire composition range because the glass transition temperature would have been too low, although the birefringence of some of the structures may have fallen into the 0.001 and below range.

TABLE III

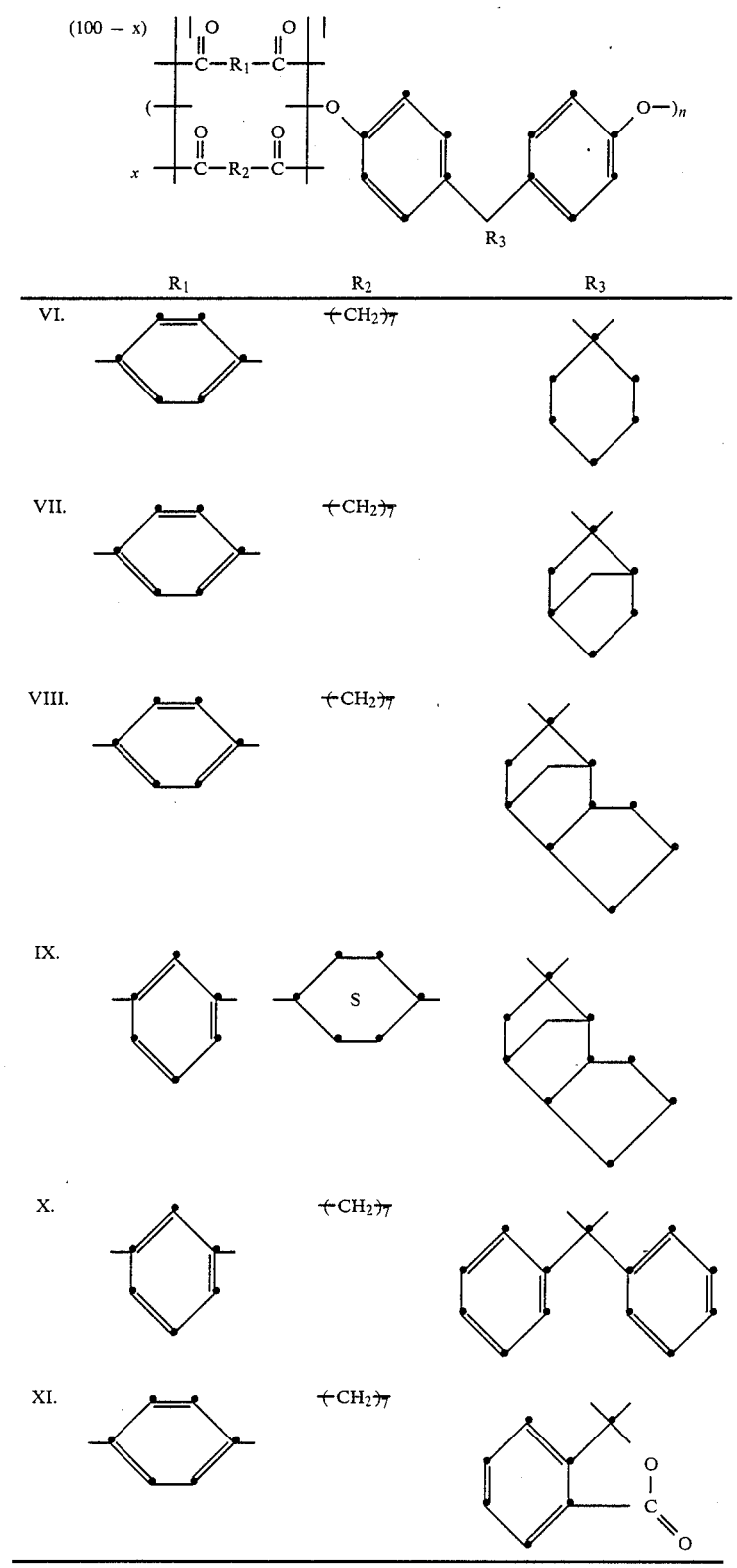

The invention has been described in detail with particular reference to preferred embodiments thereof, but it will be understood that variations and modifications can be effected within the spirit and scope of the invention.

We claim:

1. In an optical device wherein light passes through a polymeric material, the improvement wherein said polymeric material is a substantially optically anisotropic polyester having diol repeating units derived from 9,9- bis(4-hyroxyphenyl)fluorene and at least about 40% by weight of the diacid repeating units derived from aliphatic or cycloaliphatic dicarboxylic acids, the remainder of the diacid repeating units being derived from aromatic dicarboxylic acids.

2. The optical device according to claim 1 wherein the absolute value of the birefringence of said polymeric material is less than about 0.005.

3. The optical device according to claim 1 wherein the glass transition temperature of said polymeric material is greater than 125° C.

4. The optical device according to claim 1 wherein the glass transition temperature of said polymeric material is greater than 150° C.

5. The optical device according to claim 1 wherein said aromatic dicarboxylic acid is selected from the group consisting of terephthalic acid and isophthalic acid.

* * * * *